United States Patent [19]

Sandstrom

[11] Patent Number: 4,855,364
[45] Date of Patent: Aug. 8, 1989

[54] SECONDARY VULCANIZATION ACCELERATOR

[75] Inventor: Paul H. Sandstrom, Tallmadge, Ohio

[73] Assignee: The Goodyear Tire & Rubber Company, Akron, Ohio

[21] Appl. No.: 302,521

[22] Filed: Jan. 27, 1989

Related U.S. Application Data

[62] Division of Ser. No. 95,785, Sep. 14, 1987.

[51] Int. Cl.$^4$ .................. C08C 19/22; C08C 19/20; C08F 8/34
[52] U.S. Cl. ............................ 525/332.7; 525/329.3; 525/331.8
[58] Field of Search ............... 525/332.7, 329.3, 331.8

[56] References Cited

U.S. PATENT DOCUMENTS

| | | |
|---|---|---|
| 2,027,184 | 1/1936 | Lommel et al. . |
| 2,364,052 | 11/1941 | Bersworth et al. . |
| 2,395,505 | 11/1943 | Sarbach . |
| 2,395,507 | 5/1943 | Sauser . |
| 2,772,251 | 11/1956 | Hansen et al. . |
| 2,813,566 | 11/1957 | Ruggeri et al. .................. 152/330 |
| 2,849,426 | 8/1958 | Miller . |
| 3,268,493 | 8/1966 | Reynolds et al. . |
| 3,676,396 | 7/1972 | Wakefield . |
| 4,150,014 | 11/1979 | Edwards et al. . |
| 4,430,487 | 2/1984 | Sandstrom .................. 525/332.7 |

FOREIGN PATENT DOCUMENTS 869283  5/1961  United Kingdom .

Primary Examiner—Christopher Henderson
Attorney, Agent, or Firm—Alvin T. Rockhill

[57] ABSTRACT

It is often desirable to utilize accelerators in the sulfur vulcanization of unsaturated rubbers. In many cases a primary accelerator is used in combination with another accelerator, called a secondary accelerator or activator, which further increases the rate of vulcanization. It has been determined that compounds having the structural formula:

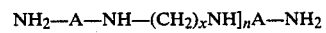

$$NH_2-A-NH-(CH_2)_xNH]_nA-NH_2$$

wherein x is 2 or 3, wherein n is an integer from 1 to 100, and wherein A represents an alkylene group containing from 1 to 20 carbons atoms, act as secondary accelerators in the vulcanization of unsaturated rubbers. For example, it has been determined that 4,7-diaza-decane-1,10-diamine is a particularly desirable secondary accelerator.

11 Claims, No Drawings

SECONDARY VULCANIZATION ACCELERATOR

This is a divisional of application Ser. No. 095,785 filed on Sept. 14, 1987.

BACKGROUND OF THE INVENTION

It is often desirable to increase the rate at which a rubber is vulcanized. By doing so the length of time required to cure a rubber article is reduced. Increased vulcanization rates accordingly lead to greater throughputs and decreased energy requirements in curing operations. Even modest increases in vulcanization rate can result in greatly increased productivity and substantial cost savings in the curing of large rubber articles, such as tires.

It is very common to include accelerators in rubber formulations in order to increase the rate at which the rubber vulcanizes. Such compounds which increase the rate at which rubbers sulfur vulcanize are widely known to persons skilled in the art and are frequently referred to as primary accelerators. Some representative examples of compounds that can be utilized as primary accelerators include thiazoles, sulfenamides, dithiocarbamates, and thiurams. In many cases the primary accelerator is used in conjunction with another accelerator, called an activator or secondary accelerator, which further increases the rate of sulfur vulcanization.

The vulcanization accelerators presently used throughout the industry present a wide variety of different problems. For instance, dithiocarbamates and thiurams, which are sometimes called "ultra-accelerators", rapidly accelerate vulcanization at conventional vulcanization temperatures, but frequently lead to the premature vulcanization of the rubber composition during processing steps, such as mixing or molding. In other words, the utilization of dithiocarbamate accelerators and thiuram accelerators frequently reduces the scorch resistance of the rubber. Sulfenamide accelerators usually do not present scorch problems, but they tend to promote slower rates of sulfur vulcanization.

Tetramethylthiuram disulfide is widely used throughout the rubber industry as both a primary accelerator and a secondary accelerator. In fact, tetramethylthiuram disulfide has an outstanding combination of properties for use as a secondary accelerator. Unfortunately, it has been reported to be mutagenic in Ames testing. For this reason it would be desirable to find a replacement for tetramethylthiuram disulfide which acts in a similar manner as a secondary accelerator but which tests Ames negative.

SUMMARY OF THE INVENTION

This invention is based on the discovery that compounds having the structural formula:

wherein x is 2 or 3, wherein n is an integer from 1 to 100, and wherein A represents an alkylene group containing from 1 to 20 carbon atoms, act as secondary accelerators in the sulfur vulcanization of rubbers. These compounds have excellent properties as secondary accelerators and can be utilized as a direct replacement for tetramethylthiuram disulfide as a secondary accelerator in productive rubber formulations. Additionally, these amines, which are utilized as secondary accelerators in accordance with the subject invention, give negative results in Ames testing.

The subject invention more specifically reveals a process for the sulfur vulcanization of an unsaturated rubber which comprises heating the unsaturated rubber to a temperature within the range of about 100° C. to about 300° C. in the presence of (a) sulfur, (b) at least one primary accelerator, and (c) at least one secondary accelerator having the structural formula:

wherein x is 2 or 3, wherein n is an integer from 1 to 100, and wherein A represents an alkylene group containing from 1 to 20 carbons atoms.

The subject invention also discloses a sulfur vulcanizable unsaturated rubber composition which is comprised of (a) at least one unsaturated rubber, (b) sulfur, (c) at least one primary accelerator, and (d) at least one secondary accelerator having the structural formula:

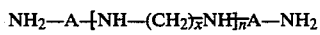

wherein x is 2 or 3, wherein n is an integer from 1 to 100, and wherein A represents an alkylene group containing from 1 to 20 carbons atoms.

DETAILED DESCRIPTION OF THE INVENTION

The secondary accelerators which are utilized in accordance with this invention have the structural formula:

wherein x is 2 or 3, wherein n is an integer from 1 to 100, and wherein A represents an alkylene group containing from 1 to 20 carbons atoms. The alkylene group in the secondary accelerator can be straight or a branched chain. It is normally preferred for the alkylene group to contain from 1 to 10 carbon atoms and for n to represent an integer from 1 to 10. It is more preferred for the alkylene group to contain from 2 to 5 carbon atoms and for n to represent an integer from 1 to 4. As a general rule, when n represents an integer from 1 to 4, the secondary accelerator will be a liquid. It is also normally preferred for x to represent the integer 2.

The secondary accelerators of this invention can be utilized to facilitate the cure of any sulfur vulcanizable rubber including natural and synthetic rubbers as well as mixtures thereof. Such sulfur curable rubbers will be unsaturated (contain double bonds). The synthetic rubbers that can be vulcanized utilizing the secondary accelerators of this invention include homopolymers and copolymers of diene monomers, which can be either conjugated or nonconjugated. Some representative examples of such synthetic rubbers include polybutadiene, polyisoprene, butyl rubber, styrene-butadiene rubber, copolymers of butadiene and isoprene, terpolymers of styrene, acrylonitrile, and butadiene, terpolymers of styrene, acrylonitrile and isoprene, terpolymers of butadiene, isoprene and styrene, ethylene-propylene rubbers, and ethylene-propylene rubbers.

The secondary accelerators of this invention are, of course, used in conjunction with one or more primary accelerators. Any type of primary accelerator known to persons skilled in the art can be used in combination with the secondary accelerators of this invention. Some representative examples of such primary accelerators include thiazole accelerators, such as benzothiazyl disulfide and 2-mercaptobenzothiazole; sulfenamide accelerators, such as N-oxydiethylene benzothiazole-2-sulfenamide, N-t-butyl-2-benzothiazolesulfenamide, and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators, such as dipentamethylene thiuram hexasulfide, tetramethylthiuram monosulfide and tetraethylthiuram monosulfide; and thiourea accelerators, such as trimethyl thiourea and dimethylethyl thiourea.

It is, of course, necessary to include sulfur in the rubber formulation being vulcanized. The sulfur can be added to the rubber formulation as elemental sulfur or in the alternative as a sulfur containing compound. Such sulfur containing compounds are known to persons skilled in the art and donate sulfur during the vulcanization procedure to facilitate cure.

Generally from about 0.02 to about 0.8 phr (parts per hundred parts of rubber) of a secondary accelerator is utilized in the sulfur vulcanizable unsaturated rubber compositions of this invention. It is generally preferred to utilize from 0.05 to 0.5 phr of a secondary accelerator in such compositions with the utilization of 0.1 to 0.3 phr of a secondary accelerator being most preferred. Generally, the sulfur vulcanizable rubber compositions of this invention will contain from about 0.2 to about 8 phr of sulfur. It is generally preferred for such sulfur vulcanizable rubber compositions to contain from 0.5 to 4 phr of sulfur with it being most preferred for such compositions to contain from 1 to 2.5 phr of sulfur. The sulfur vulcanizable unsaturated rubber compositions of this invention also normally contain from 0.1 to 2.5 phr of a primary accelerator. It is generally preferred for 0.2 to 1.5 phr of a primary accelerator to be present in such compositions with it being more preferred for such compositions to contain from 0.3 to 1 phr of a primary accelerator. The sulfur vulcanizable rubber compositions of this invention can also contain additional rubber chemicals, such as carbon black, antidegradants, oils, and waxes in conventional amounts.

The primary accelerator, secondary accelerator, sulfur and any desired rubber chemicals can be mixed throughout the rubber being vulcanized utilizing any suitable mixing technique which will result in an essentially homogeneous mixture of the compounding ingredients throughout the rubber. For instance, the compounding ingredients can be mixed throughout the rubber on a mill mixer or in a Banbury mixer. After the accelerators, sulfur, and any additional desired rubber chemicals are dispersed throughout the rubber, it can be vulcanized utilizing a standard vulcanization procedure. The utilization of the secondary accelerators of this invention in such rubber formulations will result in a faster rate of vulcanization and a higher state of cure. In most cases, the vulcanization procedure will be carried out at a temperature within the range of about 100° C. to about 300° C. In most cases it will be desirable to utilize a vulcanization temperature which is within the range of about 135° C. to about 175° C.

This invention is illustrated by the following examples which are presented merely for the purpose of illustration and are not to be regarded as limiting the scope of the subject matter or the manner in which it can be practiced. Unless specifically indicated otherwise, parts and percentages are given by weight.

EXAMPLES 1-5

In this series of experiments, the replacement of tetramethylthiuram disulfide (Tuads) with 4,7-diaza-decane-1,10-diamine was studied. In examples 1-3, 4,7-diaza-decane-1,10-diamine was used as the sole secondary accelerator. Example 4 was carried out as a comparative experiment and utilized Tuads as the sole secondary accelerator. In Example 5, a combination of 4,7-diaza-decane-1,10-diamine and Tuads was utilized as the secondary accelerator.

Rubber formulations were prepared in a two-stage process which consisted of the preparation of a nonproductive stage followed by the preparation of a productive stage. The nonproductive stage was prepared by mixing 123.75 parts of styrene butadiene rubber (Plioflex ®1712C), 10 parts of polybutadiene (Budene ®1207), 14.25 parts of an aromatic oil, 2 parts of stearic acid, 3.8 parts of a wax, 3 parts of an antioxidant (Wingstay ®300), and 80 parts of carbon black in a laboratory BR Banbury mixer which was operated at 70 rpm for about 3 minutes. After the nonproductive stage was prepared, 2 parts of zinc oxide, 0.9 parts of N-t-butyl-2-benzothiazolesulfenamide (the primary accelerator), 1.45 parts of sulfur, and the amount and type of secondary accelerator shown in Table I were mixed into the nonproductive stage by mill mixing to produce the productive stage. The cure behavior and vulcanizate properties of the rubber compositions prepared as a function of 4,7-diaza-decane-1,10-diamine and Tuads levels are shown in Table I.

TABLE I

| CURE BEHAVIOR AND VULCANIZATE PROPERTIES | | | | | |
|---|---|---|---|---|---|
| Example | 1 | 2 | 3 | 4 | 5 |
| Secondary diamine (phr) [f] | 0.05 | 0.10 | 0.15 | 0 | .05 |
| Tuads (phr) | 0 | 0 | 0 | 0.15 | .05 |
| Rheometer 149° C. | | | | | |
| Max. Torque | 35.0 | 36.0 | 37.0 | 37.0 | 36.3 |
| Min. Torque | 8.8 | 9.0 | 9.5 | 8.8 | 9.6 |
| T90, Minutes | 35.5 | 30.0 | 25.0 | 25.4 | 27.5 |
| T2, Minutes | 13.3 | 12.0 | 11.0 | 11.3 | 11.3 |
| Stress [a] TS, MPa [c] | 16.2 | 16.1 | 17.2 | 15.3 | 16.2 |
| Strain EB, % [d] | 750 | 725 | 725 | 645 | 725 |
| $M_{300}$, MPa [e] | 4.6 | 4.7 | 5.2 | 5.2 | 4.8 |
| Rebound [b] Cold, % | 44.6 | 44.1 | 43.7 | 43.7 | 43.7 |
| (ASTMD1054) Hot, % | 59.4 | 57.9 | 59.4 | 59.9 | 59.4 |

TABLE I-continued

| CURE BEHAVIOR AND VULCANIZATE PROPERTIES | | | | | |
|---|---|---|---|---|---|
| Example | 1 | 2 | 3 | 4 | 5 |
| Shore A Hardness [a] | 57 | 56 | 57 | 57 | 58 |

[a] Samples cured 35 minutes at 149° C.
[b] Samples cured 46 minutes at 149° C.
[c] TS - tensile strength.
[d] EB - elongation at break.
[e] $M_{300}$ - 300% modulus.
[f] Secondary diamine-4,7-diaza-decane-1,10-diamine.

The time required to reach 90% of cure (T90) is approximately equivalent in Examples 3 and 4 which utilize 0.15 phr of 4,7-diaza-decane-1,10-diamine and 0.15 phr of Tuads, respectively. Example 3 shows equivalent modulus and higher tensile strength when compared to Example 4. The rebound properties were similar at all levels of 4,7-diaza-decane-1,10-diamine addition (Examples 1-3) to that of the control (Example 4) which utilized Tuads as the secondary accelerator. Thus, 4,7-diaza-decane-1,10-diamine appears to be an excellent replacement for Tuads as a secondary accelerator for the sulfur vulcanization of rubber.

EXAMPLES 6-9

The utilization of 4,7-diaza-decane-1,10-diamine as a secondary accelerator in the vulcanization of polyisoprene was studied in this series of experiments. Example 6 was conducted as a control and did not utilize a secondary accelerator. Examples 7-9 contained from 0.05 to 0.2 phr of 4,7-diaza-decane-1,10-diamine as a secondary accelerator. In this series of experiments, the nonproductive stage was prepared by mixing 100 parts of synthetic polyisoprene (Natsyn ®2200), 35 parts of carbon black, 2 parts of stearic acid, and 5 parts of zinc oxide in a laboratory BR Banbury mixer which was operated at 70 rpm for 3 minutes. The productive stage was prepared by mixing 0.7 phr of N-t-butyl-2-benzothiazolesulfenamide, 2.25 phr of sulfur, and the amount of 4,7-diaza-decane-1,10-diamine indicated in Table II into the nonproductive stage by mill mixing. The cure behavior and vulcanizate properties of the rubber compositions prepared as a function of the amount of 4,7-diaza-decane-1,10-diamine utilized as a secondary accelerator are shown in Table II.

TABLE II

| CURE BEHAVIOR AND VULCANIZATE PROPERTIES | | | | |
|---|---|---|---|---|
| Example | 6 | 7 | 8 | 9 |
| Secondary diamine (phr) | 0 | .05 | .10 | .20 |
| Rheometer 149° C. | | | | |
| Max. Torque | 66.3 | 66.2 | 67.6 | 69.8 |
| Min. Torque | 10.3 | 8.7 | 9.0 | 9.8 |
| Δ Torque | 56.0 | 57.5 | 58.6 | 60.0 |
| T90, Minutes | 18.3 | 16.3 | 14.8 | 12.5 |
| T2, Minutes | 9.0 | 7.8 | 7.3 | 5.3 |
| Stress TS, MPa | 26.4 | 26.5 | 27.0 | 26.2 |
| Strain | | | | |
| EB, % | 545 | 540 | 540 | 525 |
| $M_{300}$, MPa | 10.3 | 10.1 | 10.4 | 10.5 |
| Shore A Hardness | 63 | 64 | 63 | 64 |
| Rebound Cold, % | 79.3 | 79.9 | 80.5 | 80.5 |
| Hot, % | 86.6 | 87.8 | 87.8 | 88.4 |
| Dynamic Properties 10° C. | | | | |
| Modulus kg/cm² | 80.0 | 76.9 | 80.5 | 77.9 |
| Resilience, % | 55.9 | 63.9 | 66.4 | 67.6 |
| Int. Visc., paS | 19.7 | 14.5 | 13.9 | 12.9 |
| Hx | 63.4 | 54.0 | 48.0 | 47.8 |
| Hf | 90.8 | 71.3 | 69.6 | 64.8 |
| Dynamic Properties 100° C. | | | | |
| Modulus | 76.0 | 74.3 | 75.7 | 74.1 |
| Resilience | 72.9 | 77.9 | 78.5 | 81.8 |
| Int. Visc. | 10.2 | 7.9 | 7.8 | 6.3 |
| Hx | 41.0 | 34.2 | 32.8 | 28.3 |
| Hf | 53.0 | 42.2 | 41.9 | 34.7 |

The addition of increasing amounts of 4,7-diaza-decane-1,10-diamine to the polyisoprene formulations resulted in a faster cure rate (T90) and higher rebound and resilience. Interestingly, the higher rebound and resilience was not reflected by increasing modulus or a reduction in elongation at break. This would appear to be a unique benefit that is realized by utilizing 4,7-diaza-decane-1,10-diamine as a secondary accelerator in the vulcanization of polyisoprene.

While certain representative embodiments and details have been shown for the purpose of illustrating the subject invention, it will be apparent to those skilled in this art that various changes and modifications can be made without departing from the scope of the subject invention.

What is claimed is:

1. A sulfur vulcanizable unsaturated rubber composition which is comprised of (a) at least one unsaturated rubber, (b) sulfur, (c) at least one primary accelerator, and (d) the secondary accelerator is 4,7-diaza-decane-1,10-diamine.

2. A sulfur vulcanizable unsaturated rubber composition as specified in claim 1 wherein the amount of said secondary accelerator present is within the range of 0.02 phr to 0.8 phr.

3. A sulfur vulcanizable unsaturated rubber composition as specified in claim 2 wherein the amount of sulfur present is within the range of 0.2 phr to 8 phr.

4. A sulfur vulcanizable unsaturated rubber composition as specified in claim 3 wherein the amount of primary accelerator present is within the range of 0.1 phr to 2.5 phr.

5. A sulfur vulcanizable unsaturated rubber composition as specified in claim 1 wherein from 0.05 phr to 0.5 phr of said secondary accelerator is present; wherein from 0.5 phr to 4 phr of sulfur is present; and wherein 0.2 phr to 1.5 phr of said primary accelerator is present.

6. A sulfur vulcanizable unsaturated rubber composition as specified in claim 5 which further comprises carbon black.

7. A sulfur vulcanizable unsaturated rubber composition as specified in claim 6 wherein the secondary accelerator is present in an amount within the range of 0.1 phr to 0.3 phr; wherein sulfur is present in an amount within the range of 1 phr to 2.5 phr; and wherein the primary accelerator is present in an amount within the range of 0.3 phr to 1 phr.

8. A sulfur vulcanizable unsaturated rubber composition as specified in claim 7 wherein said unsaturated rubber is natural rubber.

9. A sulfur vulcanizable unsaturated rubber composition as specified in claim 7 wherein said unsaturated rubber is selected from the group consisting of polybutadiene and styrene butadiene rubber.

10. A sulfur vulcanizable unsaturated rubber composition as specified in claim 7 wherein said unsaturated rubber is synthetic polyisoprene.

11. A sulfur vulcanizable unsaturated rubber composition as specified in claim 1 wherein said primary accelerator is N-t-butyl-2-benzothiazolesulfenamide.

* * * * *